US010681243B2

(12) United States Patent
Yanagawa

(10) Patent No.: US 10,681,243 B2
(45) Date of Patent: Jun. 9, 2020

(54) SCAN SYSTEM, METHOD, AND PROGRAM PRODUCT FOR GENERATING A FILE WITH EMBEDDED USEABLE INFORMATION FROM A SCANNED IMAGE DEPENDING ON SCANNER INFORMATION

(71) Applicant: BROTHER KOGYO KABUSHIKI KAISHA, Nagoya-shi, Aichi-ken (JP)

(72) Inventor: Ryo Yanagawa, Aichi-ken (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 16/286,848

(22) Filed: Feb. 27, 2019

(65) Prior Publication Data

US 2019/0297218 A1 Sep. 26, 2019

(30) Foreign Application Priority Data

Mar. 20, 2018 (JP) ................................. 2018-053083

(51) Int. Cl.
*H04N 1/32* (2006.01)
*H04N 1/00* (2006.01)

(52) U.S. Cl.
CPC ..... *H04N 1/32144* (2013.01); *H04N 1/00307* (2013.01); *H04N 1/32149* (2013.01);
(Continued)

(58) Field of Classification Search
CPC ........... H04N 1/00204; H04N 1/00209; H04N 1/00222; H04N 1/00225; H04N 1/00236;
(Continued)

(56) References Cited

U.S. PATENT DOCUMENTS 6,873,726 B2 * 3/2005 Tomaru ................ G06T 1/0028
382/100
9,712,710 B2 * 7/2017 Hashimoto ........... G06F 3/1232
(Continued)

FOREIGN PATENT DOCUMENTS

JP 2003271614 A * 9/2003
JP 2005222376 A 8/2005

*Primary Examiner* — Scott A Rogers
(74) *Attorney, Agent, or Firm* — Scully, Scott, Murphy & Presser, PC

(57) ABSTRACT

There is provided a non-transitory computer-readable medium storing application program executable by a processor of an information processing apparatus which communicates with a scanner having specific information. The specific information indicates whether the scanner is configured to generate a specific file for which specific processing is executable by a specific program. The application program, when executed by the processor, causes the information processing apparatus to: obtain an image read by the scanner; obtain the specific information from the scanner; and generate a file indicating the obtained image. In a case that the specific information is first information, the application program causes the information processing apparatus to generate the file with usable information embedded therein. In a case that the specific information is second information, the application program cause the information processing apparatus to generate the file without the usable information embedded therein.

12 Claims, 10 Drawing Sheets

(52) U.S. Cl.
CPC ......... *H04N 2201/0072* (2013.01); *H04N 2201/0094* (2013.01); *H04N 2201/3205* (2013.01); *H04N 2201/3226* (2013.01)

(58) Field of Classification Search
CPC ......... H04N 1/00281; H04N 1/00307; H04N 1/00318; H04N 1/0083; H04N 1/32101; H04N 1/32112; H04N 1/32128; H04N 1/32144; H04N 1/32149; H04N 1/32267; H04N 2201/0072; H04N 2201/0081; H04N 2201/0094; H04N 2201/0096; H04N 2201/3201; H04N 2201/3204; H04N 2201/2305; H04N 2201/3225; H04N 2201/3226; H04N 2201/3228
See application file for complete search history.

(56) References Cited

U.S. PATENT DOCUMENTS

| | | | |
|---|---|---|---|
| 2005/0213133 A1* | 9/2005 | Shibata | H04N 1/21 358/1.13 |
| 2011/0063655 A1* | 3/2011 | Tian | H04N 1/00209 358/1.15 |
| 2012/0194880 A1* | 8/2012 | Muroi | H04N 1/00795 358/474 |

* cited by examiner

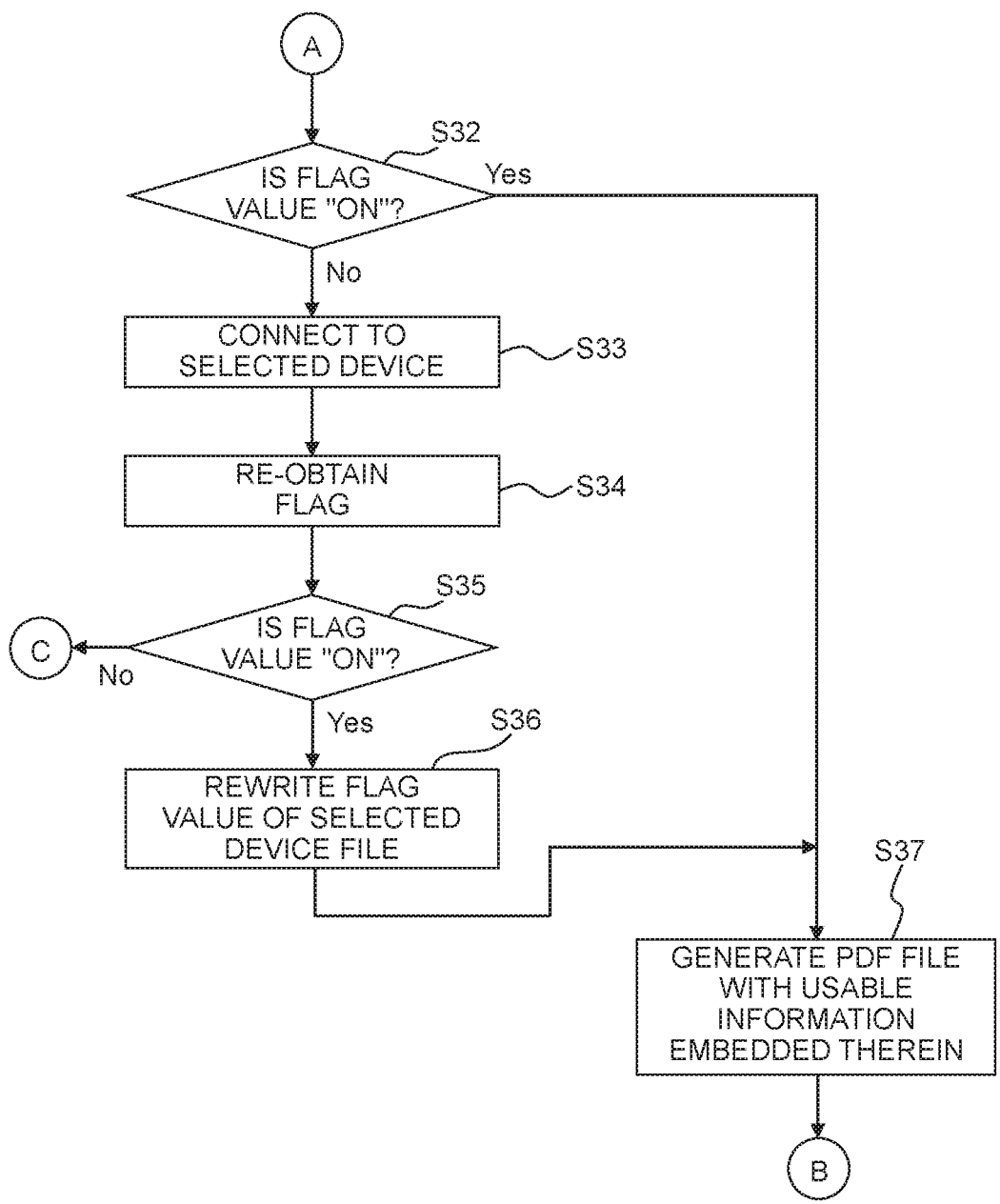

SCAN SYSTEM, METHOD, AND PROGRAM PRODUCT FOR GENERATING A FILE WITH EMBEDDED USEABLE INFORMATION FROM A SCANNED IMAGE DEPENDING ON SCANNER INFORMATION

CROSS REFERENCE TO RELATED APPLICATION

The present application claims priority from Japanese Patent Application No. 2018-053083 filed on Mar. 20, 2018 the disclosure of which is incorporated herein by reference in its entirety.

BACKGROUND

Field of the Invention

The present disclosure relates to an application program having a function of generating a file. More specifically, the present disclosure relates to a technique, in an application program, for embedding specific information in a file indicating an image read by a scanner.

Description of the Related Art

In an application program executable in an information processing apparatus such as a personal computer (PC), a smartphone, etc., there is known a technique for obtaining an image read by a scanner and generating a file indicating the image. For example, Japanese Patent Application Laid-open No. 2005-222376 discloses a system which generates a PDF file indicating an image read by a scanner, which attaches the PDF file to an e-mail and which transmits the email.

SUMMARY

There is known a specific program performing a specific processing for a file indicating an image. Among the scanners, there is a scanner capable of generating a file for which the specific processing can be executed by the specific program, and another scanner not capable of generating the file for which the specific processing can be executed by the specific program. Conventionally, in a case that an information processing apparatus utilizes the application program so as to generate the file indicating the image read by the scanner, it has not been possible to generate the file for which the specific processing can be executed by the specific program. Considering that among the scanners, some scanners are capable of generating a file for which the specific processing can be executed by the specific program and some scanner cannot generate such a file, the present specification discloses a technique for appropriately generating a file which indicates an image read by a scanner and for which the specific processing can be executed by the specific program, in a case that the information processing apparatus utilizes the application program to generate the file indicating the image read by the scanner.

According to an aspect of the present disclosure, there is provided a non-transitory computer-readable medium storing application program executable by a processor of an information processing apparatus configured to communicate with a scanner having specific information, the specific information indicating whether the scanner is configured to generate a specific file for which specific processing is executable by a specific program, the application program, when executed by the processor, causing the information processing apparatus to: obtain an image read by the scanner; obtain the specific information from the scanner; and generate a file indicating the obtained image, wherein in a case that the specific information is first information indicating that the scanner is capable of generating the specific file, the application program causes the information processing apparatus to generate the file with usable information embedded therein, the usable information indicating that the specific processing is executable for the file by the specific program, and wherein in a case that the specific information is second information indicating that the scanner is incapable of generating the specific file, the application program causes the information processing apparatus to generate the file without the usable information embedded therein.

According to the application program stored in the medium according to the aspect of the present disclosure, the specific information is obtained from the scanner. With respect to an image read by a scanner capable of generating the file for which the specific processing is executable (the file which is subjectable to the specific processing) by the specific program, namely, an image read by a scanner corresponding to the specific program, a file in which the usable information is embedded is generated. On the other hand, with respect to an image ready by a scanner incapable of generating the file for which the specific processing executable by the specific program, namely, an image read by a scanner not corresponding to the specific program, a file in which the usable information is not embedded is generated. In such a manner, the application program performs switching between generation of the file in which the usable information is embedded or generation of the file in which the usable information is not embedded, depending on the kind of the scanner which has read the image. With this, the specific processing can be executed by the specific program for a file indicating an image read by the scanner corresponding to the specific program, whereas the specific processing cannot be executed by the specific program for a file indicating an image read by the scanner not corresponding to the specific program. As a result, the specific program can execute the specific processing under a condition that the image has been read by the scanner corresponding to the specific program. Accordingly, in a case that the information processing apparatus generates a file indicating an image read by utilizing the application program with a scanner, the information processing apparatus is capable of appropriately generating a file for which the specific processing is executable by the specific program (which is subjectable to the specific processing by the specific program), depending on the corresponding state of the scanner to the specific program.

A controlling method and a computer program each of which is configured to realize the above-described function of the information processing apparatus, and a recording medium readable by a computer and storing the computer program are also novel and useful.

According to the present disclosure, there is realized a technique for appropriately generating a file for which the specific processing is executable by the specific program, in a case that the information processing apparatus utilizes the application program to generate the file indicating the image read by the scanner.

BRIEF DESCRIPTION OF THE DRAWINGS

FIGS. 7A and 7B depict a flowchart of a scanning processing.

DESCRIPTION OF THE EMBODIMENTS

In the following, an apparatus according to an embodiment of the present disclosure will be explained in detail with reference to the drawings attached hereto.

First Embodiment

Figure 1:
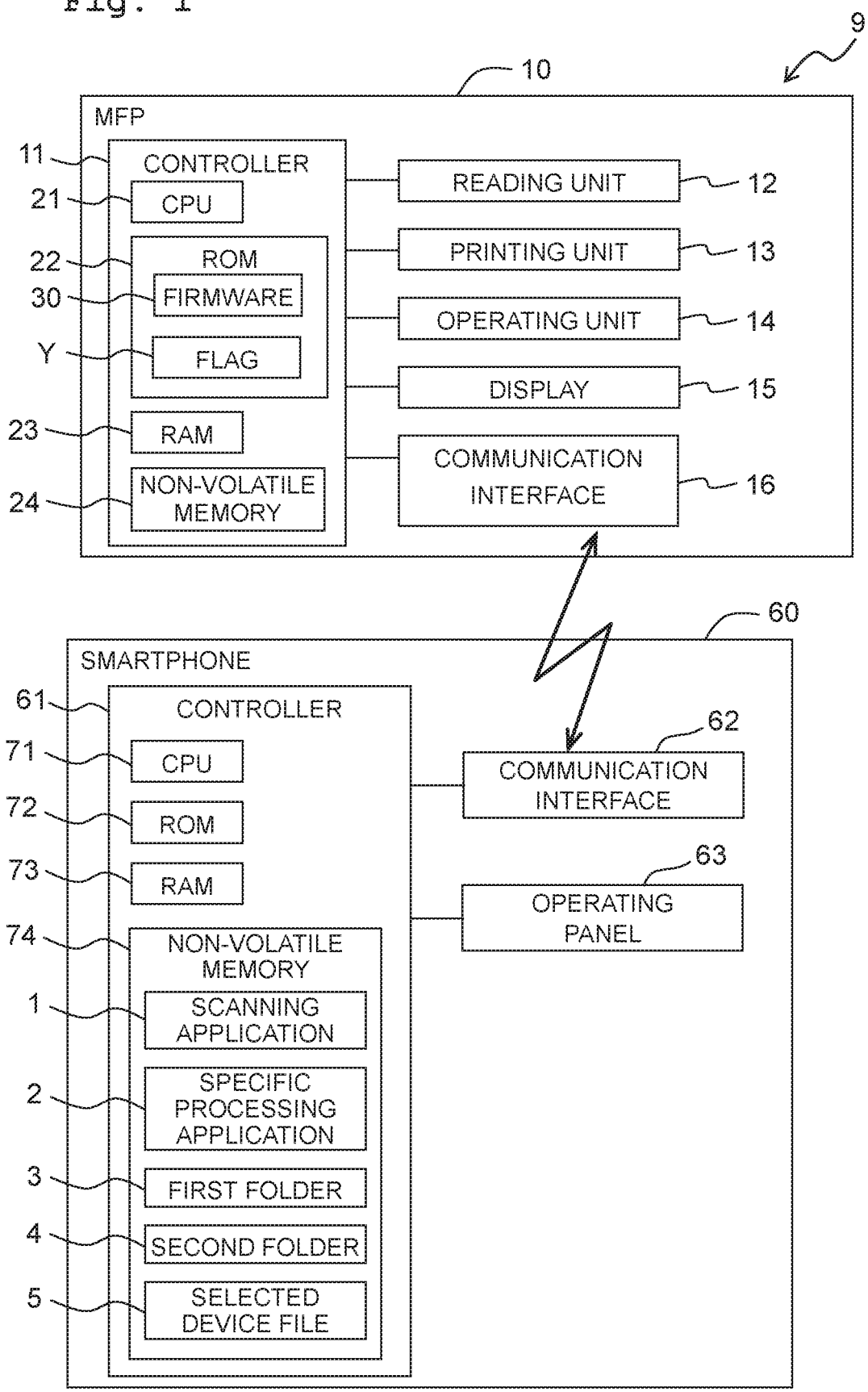
FIG. 1 is a schematic view depicting the configuration of a scan system using a scanning application according to a first embodiment of the present disclosure.

A scan system 9 as depicted in FIG. 1 has a SP (abbreviation of Smartphone) 60 and MFP (abbreviation of Multi-Function Peripheral) 10 which are provided to be communicable with each other in the scan system 9. The MFP 10 is a multi-function peripheral configured to execute a scanning function, a printing function, and FAX function. In the scan system 9, the SP 60 obtains an image read by (in) the MFP 10, and generates a file indicating the image. Further, the SP 60 performs a specific processing for a file satisfying a specific condition (subjects the file satisfying the specific condition to the specific processing). The specific condition will be described later on. The SP 60 is an example of an information processing apparatus. The SP 60 may also be a PC (personal computer), a tablet terminal, etc. The MFP 10 is an example of a scanner. The MFP 10 may also be a scanning apparatus which is capable of executing (performing) only the scanning function, or a copying apparatus which is capable of executing only the scanning function and the printing function. Namely, the MFP 10 may be a device capable of reading an image.

The MFP 10 is provided with a controller 11 including a CPU 21, a ROM 22, a RAM 23 and a non-volatile memory 24. The MFP 10 further includes a reading unit 12, a printing unit 13, an operating unit 14, a display 15 and a communication interface 16 which are electrically connected to the controller 11.

The ROM 22 stores a program such as a firmware 30 controlling a basic operation of the MFP 10. The version of the firmware 30 can be upgraded (subjectable to version-up) by rewriting, etc. Further, the ROM 22 stores a variety of kinds of information such as a flag Y. The flag Y is an example of specific information. The flag Y will be described later one.

The RAM 23 is used as a working area or as a storage area for temporarily storing a data when a variety of kinds of operations are to be executed. The non-volatile memory 24 is, for example, an HDD, a flash memory, etc., and stores a variety of kinds of programs and/or data. The non-volatile memory 24 stores, for example, data of an image read in accordance with an instruction from the SP 60 until the data is transmitted to the SP 60.

The CPU 21 executes the variety of kinds of processing in accordance with a program read from the ROM 22 or the non-volatile memory 24, or based on an instruction from a user. Note that the controller 11 is a general term (generic name) for collectively indicating hardware(s) and software(s) utilized for controlling the MFP 10, and does not necessarily indicate any single hardware which is actually present in the MFP 10.

The reading unit 12 is an apparatus configured to read an image of an original (manuscript). The printing unit 13 is an apparatus configured to print an image on a recording medium based on data of the image (image data). The operating unit 14 is an apparatus which receives an input from the user. The display 15 is an apparatus configured to display information thereon. The communication interface 16 includes a hardware for performing communication with an external apparatus such as the SP 60, etc. The communication system of the communication interface 16 may be of any standard, such as the USB, Wi-Fi (trade name), Bluetooth (trade name), etc., and may be of a wired or wireless system.

On the other hand, the SP 60 is provided with a controller 61 including a CPU 71, a ROM 72, a RAM 73 and a non-volatile memory 74. Further, the SP 60 is provided with a communication interface 62 and an operating panel 63 which are electrically connected to the controller 61.

The ROM 72 stores a variety of kinds of programs, etc. The RAM 73 is used as a working area or as a storage area for temporarily storing a data when a variety of kinds of operations are to be executed. The non-volatile memory 74 is, for example, an HDD, a flash memory, etc., and is used as an area for storing a variety of kinds of programs and/or data.

The CPU 71 executes the variety of kinds of processing in accordance with a program read out from the ROM 72 or the non-volatile memory 74, or based on an instruction from the user. Note that the controller 61 is a general term (generic name) for collectively indicating hardware(s) and software(s) utilized for controlling the SP 60, and does not necessarily indicate any single hardware which is actually present in the SP 60. The CPU 71 is an example of a computer. Note that the controller 61 may be made to be an example of the computer.

The communication interface 62 includes a hardware for performing communication with an external apparatus which is connected to the communication interface 62 via a network. The operating panel 63 is, for example, a touch panel; the operating panel 63 receives an input from the user and displays information thereon.

The SP 60 of the present embodiment stores a scanning application 1 and a specific processing application 2 in the non-volatile memory 74. Further, the SP 60 provides a first folder 3 and a second folder 4 on the non-volatile memory 74. Furthermore, the SP 60 stores a selected device file 5 in the non-volatile memory 74. The scanning application 1 is an example of an application program. The specific processing application 2 is an example of a specific program. The non-volatile memory 74 is an example of a memory.

Figure 2:
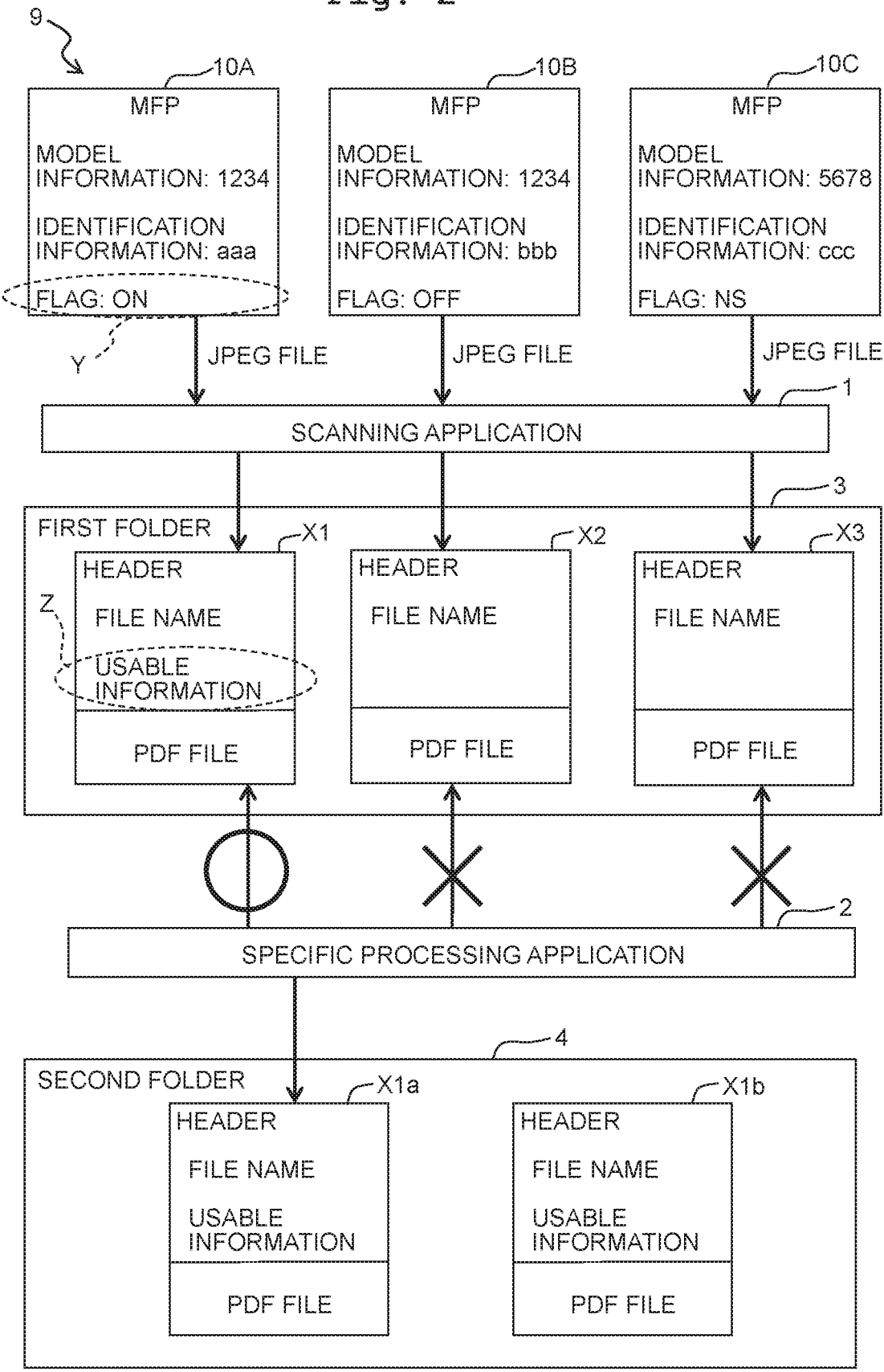
FIG. 2 is a view explaining the overview of the operation of the scanning application.

As depicted in FIG. 2, the scanning application 1 is an application which obtains an image read by the MFP 10 that is a separate body from the SP 60, which generates a file indicating the image in a file format designated by an user, and which stores the generated file in a predetermined storing destination (storing target). In the present embodiment, the predetermined storing destination is the first folder 3. The file format is, for example, PDF, JPEG, etc.

The specific processing application 2 is configured to perform a specific processing for a file, stored in the predetermined storage destination (namely, the first folder 3), under a condition that (in a case that) said file satisfies a predetermined condition. A case in which the predetermined condition is satisfied is, for example, such a case that a file includes usable information Z indicating that the file is such a file for which the specific processing is executable by the specific processing application 2 (indicating that the file is subjectable to the specific processing by the specific processing application 2). The specific processing is, for example, a processing for changing the file name, a processing for dividing the file into a plurality of files, etc. In the present embodiment, a command indicating the content of the specific processing is embedded in an image such as a barcode, etc. A file processed by the specific processing application 2 is stored in the second folder 4.

Here, the MFP 10 includes a MFP 10 capable of generating a file subjectable to the specific processing by the specific processing application 2, namely a file including the usable information Z. and a MFP 10 not capable of generating the file subjectable to the specific processing by the specific processing application 2. Namely, the MFP 10 includes a MFP 10 corresponding to the specific processing application 2 and an MFP 10 not corresponding to the specific processing application 2. In view of this situation, a flag Y, in addition to model information and identification information, is stored in the ROM 22 of the MFP 10.

The model information is information indicating the model (make, type) of the MFP 10, and is, for example, a model number. The identification information is information uniquely given to the MFP 10 and is, for example, a product number, an IP address, a MAC address, etc. The flag Y is information indicating as to whether or not the device is a device capable of generating a file subjectable to the specific processing by the specific processing application 2. Namely, the flag Y is information indicating the corresponding state of the MFP 10 to the specific processing application 2. In the present embodiment, the re-writing of the flag Y is performed by an operation permitted only to a service representative (person in charge of service).

In the flag Y, any of a "ON", "OFF", and "NS (abbreviation of "Not Supported") is set as a flag value.

The flag value of "ON" indicates that the MFP 10 is capable of corresponding to the specific processing application 2, and is set to correspond to the specific processing application 2. The flag value of "OFF" indicates that the MFP 10 is capable of corresponding to the specific processing application 2, but is not set to correspond to the specific processing application 2. The flag value of "NS" indicates that the MFP 10 does not correspond to the specific processing application 2.

For example, among MFPs 10 as depicted in FIG. 2, MFPs 10A and 10B having model information of "1234" are each a model capable of corresponding to the specific processing application 2, and a MFP 10C having model information of "5678" is a model not corresponding to the specific processing application 2.

The MFPs 10A and 10B each as the model capable of corresponding to the specific processing application 2 can either be set, or be not set, to correspond to the specific processing application 2, depending on the usage or management of the MFPs 10A and 10B. The MFP 10A has the flag value, of the flag Y, which is "ON", and is set to correspond to the specific processing application 2. Namely, the MFP 10A is capable of generating a file in which the usable information Z is embedded. On the other hand, the MFP 10B has the flag value, of the flag Y, which is "OFF", and is not set to correspond to the specific processing application 2. Namely, the MFP 10B does not generate a file in which the usable information Z is embedded.

There is such a possibility that the corresponding state to the specific processing application 2 of each of the MFPs 10A and 10B might be changed due to any change in the usage or management thereof. For example, in the MFP 10B having the flag value, of the flag Y, which is "OFF", there is such a possibility that the flag value of the flag Y might be changed from "OFF" to "ON" by any upgrading of the firmware 30 and thereby might be changed to a model corresponding to the specific processing application 2. On the other hand, in the MFP 10A having the flag value, of the flag Y, which is "ON", there is such a possibility that the flag value of the flag Y might be changed from "ON" to "OFF" by, for example, the passing of trial period for the firmware 30 corresponding to the specific processing application 2, and thereby might be changed to a model not corresponding to the specific processing application 2.

In contrast, in the MFP 10C which is not capable of corresponding to the specific processing application 2, namely, which is the model not corresponding to the specific processing application 2, the flag value of "NS" is set in the flag Y. Namely, the MFP 10C does not generate a file in which the usable information Z is embedded. In the model not corresponding to the specific processing application 2, the flag value is not principally changed from "NS".

Note that in the present specification, the MFPs 10A, 10B, 10C . . . are comprehensively described as "MFP 10" unless there is no particular need to distinguish the MFPs 10A, 10B, 10C . . . from one another.

The MFP 10 hands over (transmits) an image read in the reading unit 12 to the SP 60, in the JPEG format (while converting the image in the JPEG format). Namely, the MFP 10 hands over, to the SP 60, a file not including the usable information Z. Since the SP 60 is a separate body from the MFP 10, merely receiving a JPEG file from the MFP 10 does not make it possible to determine whether or not the MFP 10 corresponds to the specific processing application 2, and thus it is not possible to generate a PDF file X which is subjectable to the specific processing by the specific processing application 2. In view of this situation, the scanning application 1 is configured to obtain the flag Y from the MFP 10 which reads the image, and to embed the usable information Z to the PDF file X, depending on the flag value.

Namely, the scanning application 1 embeds the usable information Z in a PDF file X1 indicating an image read by the MFP 10A of which flag value of the flag Y is "ON", in a similar manner in a case that the MFP 10A generates the file. Further, the scanning application 1 does not embed the usable information Z in a PDF file X2 indicating an image read by the MFP 10B of which flag value of the flag Y is "OFF", in a similar manner in a case that the MFP 10B generates the file. Furthermore, the scanning application 1 does not embed the usable information Z in a PDF file X3 indicating an image read by the MFP 10C of which flag value of the flag Y is "NS", in a similar manner in a case that the MFP 10C generates the file. Note that in the present specification, the PDF files X1, X2, X3 . . . are comprehensively described as "PDF file X" unless there is no particular need to distinguish the PDF files X1, X2, X3 . . . from one another.

The first folder 3 is a storage area in which the scanning application 1 stores files generated by the scanning application 1. Accordingly, the PDF file X1 in which the usable information Z is embedded, as well as the PDF files X2 and X3 in each of which the usable information is not embedded, are stored in the first folder 3. Further, the first folder 3 stores therein also a file generated in a format different from the PDF format.

The second folder 4 is a storage area in which the specific processing application 2 stores data processed by the specific processing application 2. It is allowable that the second folder 4 is not a memory inside the SP 60, but that the second folder 4 is an external storage medium such as a USB, FTB server, cloud server, etc. Further, the second folder 4 is not limited to or restricted by being a single folder, and may be constructed of a plurality of folders. In such a case, for example, divided files X1a, X1b which are divided from the PDF file X1 may be stored in separate folders, respectively.

Figure 3:
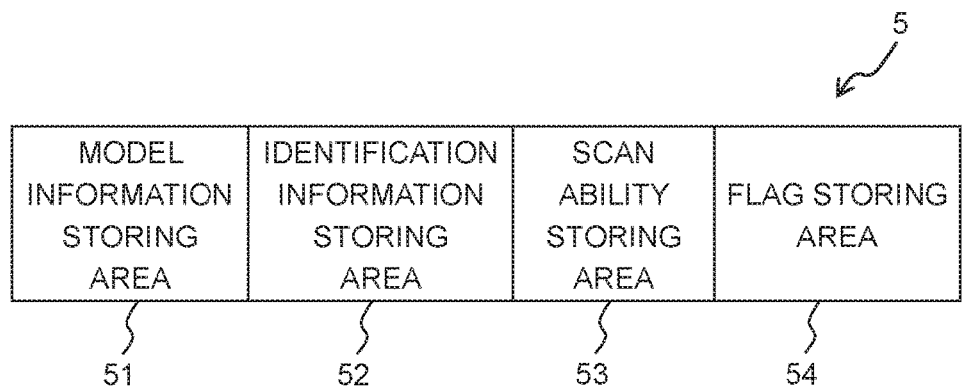
FIG. 3 is a view depicting an example of a data construction of a selected device file.

As depicted in FIG. 3, the selected device file 5 stores information regarding a selected device as an object for which the scanning is to be executed (hereinafter referred also to as "selected device"). For example, a model information storing area 51, an identification information storing area 52, a scanning ability storing area 53 and a flag storing area 54 are present in the selected device file 5.

Model information of the selected device is stored in the model information storing area 51. The model information is, for example, the model number. Identification information uniquely given to the selected device is stored in the identification information storing area 52. The identification information is, for example, the product number, the ID address, the MAC address, etc. Information regarding the scanning ability of the selected device is stored in the scanning ability storing area 53. The information regarding the scanning ability includes, for example, the resolution, color reproduction property, etc. The flag value, of the flag Y, which is obtained from the selected device is stored in the flag storing area 54.

Next, the overview of the operation of the scan system 9 will be explained with reference to FIGS. 4 and 5. Note that the respective steps in the following procedure and flowcharts indicate, basically, the processing by the CPU in accordance with instruction(s) described in a program such as an application, a module, etc. Namely, "determination (determining)", "selection (selecting)", "obtainment (obtaining)", "receipt (receiving)", "control (controlling)", etc., in the following explanation indicate the processing(s) by the CPU. The processing(s) by the CPU also includes a hardware control using the API (abbreviation of "Application Program Interface") of the OS (abbreviation of "Operating System") of the apparatus. In the present specification, the description of the OS is omitted, and the operations of the respective programs are described. Namely, in the following explanation, such a phrase or expression that "a program controls a hardware" may indicate that "a program controls a hardware by using the API of the OS". Note that the "obtainment (obtaining)" is used in a concept that does not necessarily require any request or demand. Namely, a processing of receiving data (a piece of data) without any request or demand from the CPU also included in the concept of "the CPU obtains data". Further, the term "data" in the present specification is expressed in a bit string readable by a device. Furthermore, a plurality of pieces of data which have substantially same meaning and content but mutually different formats are handled as same data. This is similarly applicable also to the term "information" in the present specification.

Figure 4:
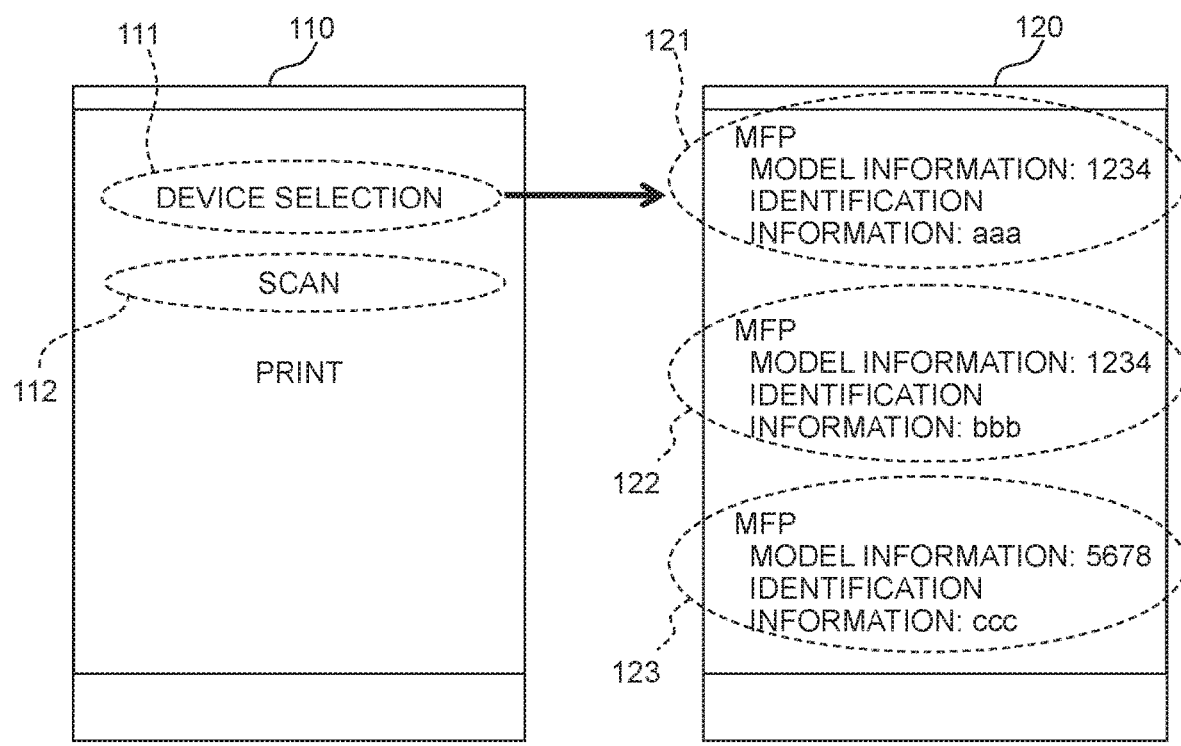
FIG. 4 is a view depicting transition from an initial screen to a device selecting screen.

In a case that, for example, a device selection 111 is tapped in an initial screen 110 of the scanning application 1, as depicted in FIG. 4, in state that the scanning application 1 is activated, the SP 60 searches a device communicable with the SP 60, and displays a device selecting screen 120. As depicted with reference numerals 121, 122 and 123 in FIG. 4, the device selecting screen 120 displays model information and identification information of each of the searched devices. For example, in a case that the information indicating a MFP among the MFPs 10 is tapped, the SP 60 receives the tapped MFP 10 as the selected device. The SP 60 accesses the selected MFP 10 again, and obtains an ability value(s) such as the scanning ability, the flag Y, etc. Then, the SP 60 generates the selected device file 5 and stores the selected device file 5 in the non-volatile memory 74. With this, the flag Y of the selected MFP 10 is permanently stored in the SP 60.

In a case that a scan 112 of the initial screen 110 as depicted in FIG. 4 is tapped after the completion of device selection, the SP 60 transmits a scan executing instruction to the selected MFP 10, and causes the MFP 10 to read an image of an original. The SP 60 receives a JPEG file of the read image by the MFP 10, and then causes, for example as depicted in FIG. 5, a received image 131 to be displayed on an image confirming screen 130. In a case that a save button 132 is tapped, the SP 60 displays a file format selecting screen 140. In a case that a PDF 141 is selected, the SP 60 generates a PDF file X indicating the image read by the selected device.

As depicted in FIG. 2, in a case that the MFP 10A in which the flag value of the flag Y is set to "ON" is selected as the selected device and that the SP 60 receives the JPEG file from the MFP 10A, the SP 60 generates a PDF file X1 in which the usable information Z is embedded in the header thereof.

On the other hand, in a case that the MFP 10B in which the flag value of the flag Y is set to "OFF" is selected as the selected device and that the SP 60 receives the JPEG file from the MFP 10B, the SP 60 generates a PDF file X2 in which the usable information Z is not embedded in the header thereof, as depicted in FIG. 2. Further, in a case that the MFP 10C in which the flag value of the flag Y is set to "NS" is selected as the selected device and that the SP 60 receives the JPEG file from the MFP 10C, the SP 60 generates a PDF file X3 in which the usable information Z is not embedded in the header thereof, as depicted in FIG. 2. The SP 60 stores the generated PDF file X in the first folder 3.

Next, the operation of the specific processing application 2 will be explained. In the SP 60, the specific processing application 2 is activated at all the time, and monitors any storage of a file(s) to the first folder 3.

In a case that the PDF file X1 in which the usable information is embedded is stored in the first folder 3, the specific processing application 2 performs the specific processing for the PDF file X1, in accordance with a command embedded in the image of the PDF file X1. For example, in a case that the command is file division, the specific processing application 2 divides the PDF file X1 into a divided file X1a and a divided file X1b, and stores these divided files X1a and X1b in the second folder 4. Further, for example, in a case that the command is file re-naming, the specific processing application 2 changes the name of the PDF file X1 and stored the renamed PDF file X1 in the second folder 4.

In contrast, even if the PDF files X2 and X3 in each of which the usable information is not embedded are stored in the first folder 3, the specific processing application 2 does not perform the specific processing for the PDF files X2 and X3.

In such a manner, the SP 60 obtains the flag Y from the selected MFP 10, and generates a PDF file X in which the usable information Z is embedded, depending on the flag Y. By doing so, it is possible to perform or execute, by the specific processing application 2, the specific processing for the PDF file X of the image read by the MFP 10 which corresponds to the specific processing application 2. Namely, by the specific processing application 2, the specific processing can be performed under a condition that the image has been read by the MFP 10 corresponding to the specific processing application 2. Accordingly, in a case that the SP 60 generates the PDF file X indicating the image read by the MFP 10 with the use of the scanning application 1, the SP 60) is capable of appropriately generating the PDF file X which is subjectable to the specific processing (for which the specific processing can be performed) by the specific processing application 2, depending on the corresponding state of the MFP 10 to the specific processing application 2.

Figure 6:
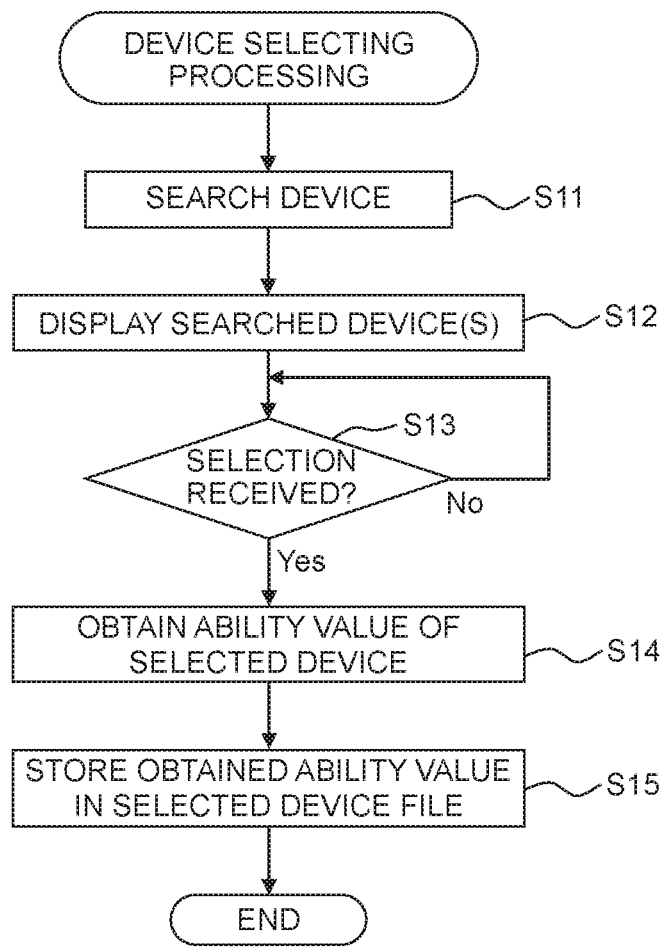
FIG. 6 is a flowchart of a device selecting processing.

Next, the specific procedure in the operation of the scanning application 1 will be explained with reference to FIGS. 6 and 7. Under a condition that the scanning application 1 is activated and that the device selection 111 is tapped in the initial screen 110 as depicted in FIG. 4, the CPU 71 of the SP 60 is triggered by the tapping and executes (performs) a device selecting processing as depicted in FIG. 6.

The CPU 71 controls the communication interface 62 so as to search a communicable device (S11). The CPU 71 controls the operating panel 63 so as to display, as a list, detected device(s) in the device selecting screen 120 as depicted in FIG. 4 (S12). Namely, the CPU 71 obtains the model information and the identification information from the device(s) with which the CPU successfully communicated via the communication interface 62, and the CPU displays the device(s) in the device selecting screen 120.

Afterwards, the CPU 71 determines whether the selection of device is received (S13). Until any one of the device(s) displayed in the device selecting screen 120 is tapped, the CPU 71 stands by (S13: NO).

In a case that one of the device(s) displayed in the device selecting screen 120 is tapped, the CPU 71 receives the tapped device as the selected device (S13: YES). Then, the CPU 71 controls the communication interface 62 so as to connect to the communication interface 16 of the selected device (namely, MFP 10) selected in step S13, and obtains the ability value(s) from the selected device (MFP 10) (S14). The processing in step S14 is an example of a specific information obtaining processing. Since the CPU 71 obtains the information such as the scanning ability, the flag Y, etc., only from the selected MFP 10, the time for processing is shortened.

Further, the CPU 71 stores the ability value(s) obtained in step S14 in the selected device file 5 (S15). Namely, the CPU 71 stores, in the non-volatile memory 74, the ability value(s) such as the scanning ability, the flag Y, etc., obtained by the CPU 71 in step S14, while correlating (associating) the ability value(s) with the model information and the identification information obtained by the CPU 71 while searching the device(s) in step S11.

Namely, the CPU 71 causes the model information and the identification information, which are included in the model information and the identification information obtained by the CPU 71 while searching the device(s) in step S11 and which are related to the selected MFP 10, to be stored in the model information storing area 51 and the identification information storing area 52, respectively, of the selected device file 5 as depicted in FIG. 3. Further, the CPU 71 causes the information regarding the scan ability, which is included in the ability value(s) obtained in step S14, to be stored in the scan ability storing area 53 of the selected device file 5 as depicted in FIG. 3.

Furthermore, the CPU 71 causes the flag Y obtained in step S14 to be stored in the flag storing area 54 of the selected device file 5 as depicted in FIG. 3. For example, in such a case that the flag value of the obtained flag Y is "ON", the CPU 71 causes "ON" to be stored in the flag storing area 54. Similarly to this, the CPU 71 is also capable of causing "OFF" or "NS" to be stored in the flag storing area 54. With this, the corresponding state of the selected MFP 10 to the specific processing application 2 is permanently stored in the SP 60. Afterwards, the CPU 71 ends the processing (procedure) depicted in FIG. 6.

After the CPU 71 ends the device selecting processing as depicted in FIG. 6, the CPU 71 displays the initial screen 110 as depicted in FIG. 4. Under a condition that the scan 112 is tapped in the initial screen 110 depicted in FIG. 4, the CPU 71 is triggered by the tapping and executes (performs) a scanning processing as depicted in FIG. 7.

In the scanning processing, the CPU 71 accesses, via the communication interface 62, the MFP 10 selected in the device selecting processing in FIG. 6, and the CPU 71 transmits a scan executing instruction to the selected MFP 10 (S21). The MFP 10 reads an image of an original set in the reading unit 12, and transmits a JPEG file indicating the read image back to the SP 60 via the communication interface 16.

Figure 5:
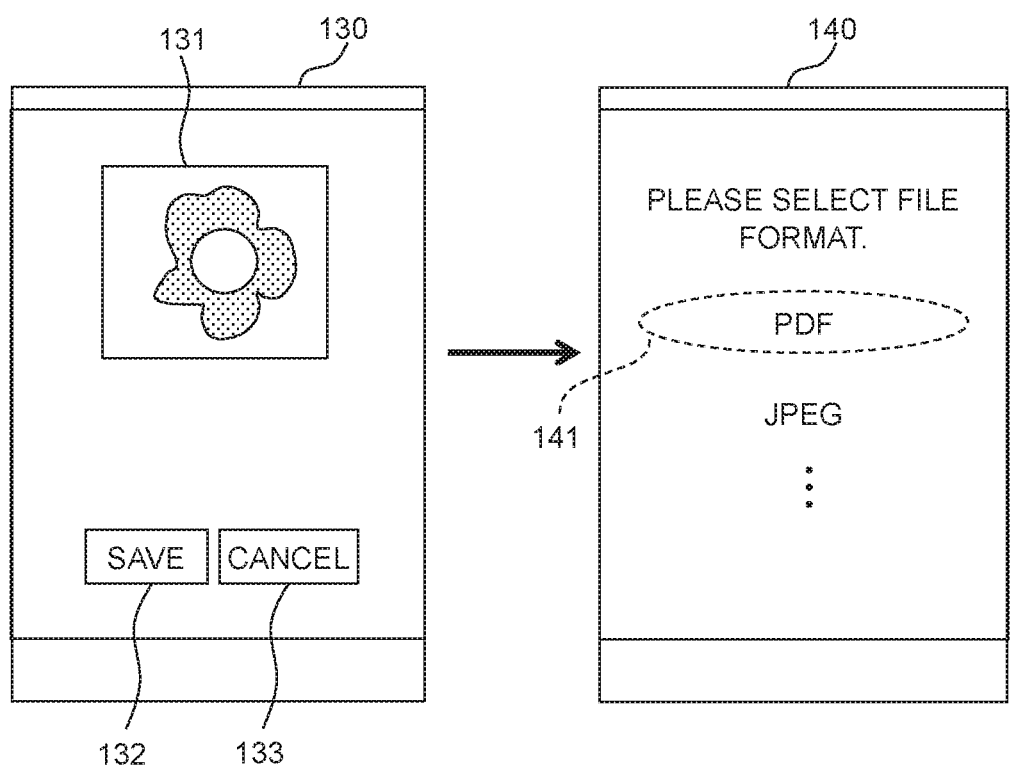
FIG. 5 is a view depicting transition from an image confirming screen to a file format selecting screen.

In a case that the CPU 71 receives the data (namely, the JPEG file) from the MFP 10 (S22), the CPU 71 controls the operating panel 63 to display a received image 131 on the image confirming screen 130 depicted in FIG. 5 (S23). The processing in step S22 is an example of an image obtaining processing. Then, the CPU 71 waits for an instruction whether the image is to be saved (retained) or canceled (S24). In a case that a cancel button 133 of the image confirming screen 130 is tapped, the CPU 71 receives a cancelling instruction (S24: CANCEL), and ends the processing as depicted in FIG. 7. Namely, the CPU 71 does not generates a file of the image 131 read by the MFP 10.

On the other hand, in a case that the save button 132 of the image confirming screen 130 is tapped, the CPU 71 receives a saving instruction (S24: SAVE) and causes the operating panel 63 to display the file format selecting screen 140 as depicted in FIG. 5 (S25). Then, the CPU 71 determines whether a file format which is selected (hereinafter referred to as "selected file format") is the PDF file (S26). In a case that a file format different from the PDF (such as JPEG) is tapped among the file formats displayed in the file format selecting screen 140, the CPU 71 determines that the selected file format is not a PDF file (S26: NO). In this case, the CPU 71 generates a file in a selected file format, and causes the generated file to be stored in the first folder 3 (S27).

In contrast, in a case that the PDF 141 is tapped among the file formats displayed in the file format selecting screen 140, the CPU 71 determines that the selected file format is a PDF file format (S26: YES). In this case, the CPU 71 reads out the flag value stored in the flag storing area 54 of the selected device file 5 (S28). Since the flag value stored in the flag storing area 54 when the device has been selected is used, the number of times by which the CPU 71 communicates with the selected device during the execution of scanning is reduced, thereby making it possible to shorten the time required for the scanning. Then, the CPU 71 determines whether the flag value read out in step S28 is "NS" (S29).

In a case that the CPU 71 determines that the flag value read out in step S28 is "NS" (S29: YES), the CPU 71 generates a PDF file indicating the received image, without embedding the usable information Z in the header of the PDF file which is being generated (S30). Afterwards, the CPU 71 causes the generated PDF file to be stored in the first folder 3 (S31), and then ends the processing.

Namely, in a case that the CPU executes the scanning by using the MFP 10C not corresponding to the specific processing application 2, the CPU 71 generates a PDF file X3 in which the usable information Z is not embedded. Namely, the CPU 71 does not perform the specific processing even when the CPU 71 accesses the PDF file X3 of the image read by the MFP 10C not corresponding to the specific processing application 2.

On the other hand, in a case that the CPU 71 determines that the flag value of the flag Y read out in step S28 is not "NS" (S29: NO), the CPU 71 determines whether the flag value read out in step S28 is "ON" (S32). In a case that the CPU 71 determines that the flag value read out in step S28 is "ON" (S32: YES), the CPU 71 generates a PDF file X of the received image, while embedding the usable information Z in the header of the PDF file which is being generated (S37). Afterwards, the CPU 71 causes the generated PDF file X to be stored in the first folder 3 (S31), and then ends the processing.

Namely, in a case that the CPU 71 executes the scanning by means of (with) the MFP 10A which is capable of corresponding to the specific processing application 2 and which is allowed to correspond to the specific processing application 2, the CPU 71 generates a PDF file X1 in which the usable information Z is embedded. Accordingly, the specific processing application 2 is capable of performing the specific processing to the PDF file X1 of the image read by the MFP 10A which corresponds to the specific processing application 2.

In contrast, in a case that the CPU 71 determines that the flag value read out in step S28 is "OFF", namely, not "ON" (S32: NO), the CPU 71 accesses the selected MFP 10 (S33). Then, the CPU 71 re-obtains the flag Y of the MFP 10 (S34), and determines whether the flag value of the re-obtained flag Y is "ON" (S35). The CPU 71 obtains the flag Y again, since there is such a possibility that the MFP 10 is a model which is capable of corresponding to the specific processing application 2 and that the MFP 10 might be set to correspond to the specific processing application 2, namely, the flag value of the flag Y might be changed to "ON", due to, for example, upgrade, etc. Namely, in a case that the known flag value of the selected device is "OFF", the CPU 71 re-obtains the latest flag value of the selected device, and determines whether the re-obtained flag value is "ON".

In a case that the re-obtained flag value is "OFF", namely that the re-obtained flag value is not "ON" (S35: NO), the CPU 71 generates a PDF file X in which the usable information Z is not embedded (S30).

On the other hand, in a case that the CPU 71 determines that the re-obtained flag value is "ON" (S35: YES), the CPU 71 rewrites the flag value stored in the flag storing area 54 of the selected device file 5 from "OFF" to "ON" (S36). With this, in a case that the CPU 71 executes the scanning processing the next time, it is possible for the CPU 71 to determine that the flag value is "ON" in the processing of step S32. Since the processing in each of steps S33 to S36 is omitted, it is possible to reduce the number of times for the communication. It is required to take a few seconds to establish the communication between the SP 60 and the MFP 10. By reducing the number of times of the communications, the waiting time for the user can be shortened.

After rewriting the flag Y in step S36, the CPU 71 generates a PDF file X in which the usable information Z is embedded (S37). Namely, in a case that the flag value of the flag Y of the MFP 10B is "OFF" at the time of the device selection and then the flag value of the flag Y of the MFP 10B is changed to "ON" due to upgrade of the firmware 30, the CPU 71 is capable of generating a PDF file X in which the usable information Z is embedded, corresponding to the latest flag Y.

Then, the CPU 71 causes the PDF file generated in step S37 to be stored in the first folder 3 (S31), and then ends the processing. Note that the processing of steps S29, S31 and S32 to S37 is an example of the file generating processing.

Note that the specific processing application 2 is activated at all times and monitors the first folder 3. In a case that the file generated by the scanning application 1 is stored in the first folder 3, and that the stored file is the PDF file X1 in which the usable information Z is embedded, the specific processing application 2 performs the specific processing in accordance with the command embedded in the image of the PDF file X1. On the other hand, in a case that the stored file is the PDF file X2 or X3 in which the usable information Z is not embedded, the CPU does not perform the specific processing.

As explained above, the scanning application 1 which has the function of generating a file indicating an image obtains, from the MFP 10, the flag Y regarding as to whether the MFP 10 is capable of generating a file for which the specific processing application 2 can perform the specific processing (a file subjectable to the specific processing by the specific processing application 2). The scanning application 1 generates the PDF file X1 in which the usable information Z is embedded, under a condition that the image is read by the MFP 10A capable of generating a file subjectable to the specific processing by the specific processing application 2, namely, read by the MFP 10A corresponding to the specific processing application 2. On the other hand, the scanning application 1 generates the PDF file X2 or X3 in which the usable information Z is not embedded, under a condition that the image is read by the MFP 10B or 10C not capable of generating the file subjectable to the specific processing by the specific processing application 2, namely, read by the MFP 10B or 10C not corresponding to the specific processing application 2. In such a manner, the scanning application 1 switches between the generation of the PDF file X1 in which the usable information Z is embedded and the generation of the PDF file X2 or X3 in which the usable information Z is not embedded, depending on the kind of the MFP 10 which has read the image. With this, in the specific processing application 2 subjecting the PDF file X1 in which the usable information Z is embedded to the specific processing, the specific processing can be performed for the PDF file X1 indicating the image read by the MFP 10A corresponding to the specific processing application 2, but the specific processing cannot be performed for each of the PDF file X2 and X3 indicating the images read by the MFP 10B and the MFP 10C, respectively, not corresponding to the specific processing application 2. Namely, the specific processing application 2 is capable of performing the specific processing under a condition that the image has been read by the MFP 10A corresponding to the specific processing application 2. Accordingly, in a case that the SP 60 generates the PDF file X indicating the image read by the MFP 10 with the use of the scanning application 1, the SP 60 is capable of appropriately generating the PDF file X subjectable to the specific processing by the specific processing application 2, depending on the corresponding state of the MFP 10 to the specific processing application 2.

Second Embodiment

Figure 8:
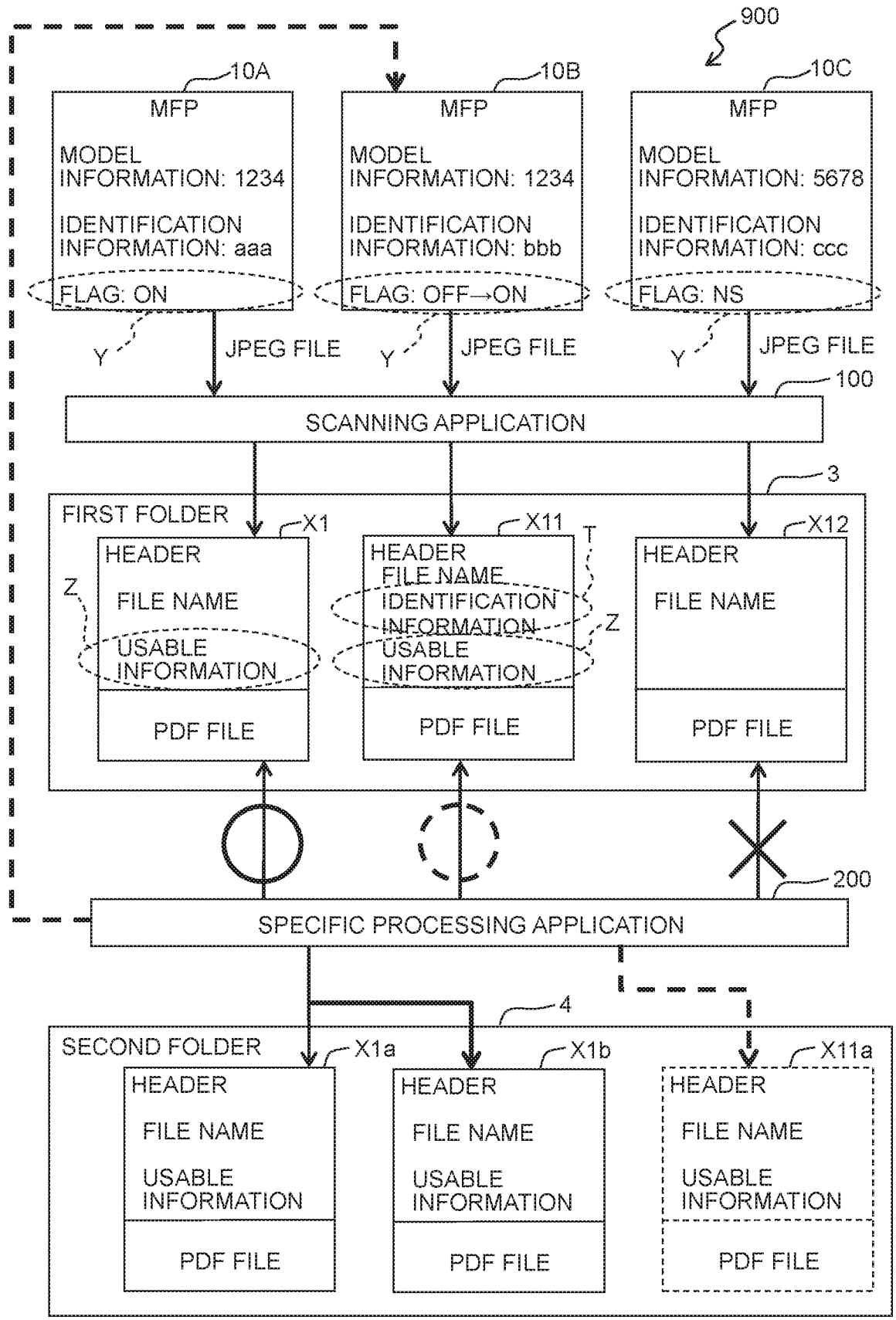
FIG. 8 is a view explaining the overview of the operation of a scanning application according to a second embodiment of the present disclosure.

Next, a second embodiment of the present disclosure will be explained. As depicted in FIG. 8, a scan system 900 is constructed similarly as in the first embodiment, except for a scanning application 100 and a specific processing application 200. In the following, the difference between the second and first embodiments will be mainly explained, and regarding the common points with the first embodiment will be referred to with the use of the same reference numerals as those in the first embodiment, and the explanation therefor will be omitted as appropriate.

There is known a specific program performing a specific processing for (with respect to) a file indicating an image. Among the scanners, there is a scanner capable of generating a file for which the specific processing can be executed by (in) the specific program, and another scanner not capable of generating the file for which the specific processing can be executed by (in) the specific program. Namely, among the scanners, there are some scanners corresponding to the specific program, and there are other scanners not corresponding to the specific program. There is such a possibility that even a scanner not corresponding to the specific program at the time of purchase might correspond to the specific program later. Conventionally, a file indicating an image read by the scanner not corresponding to the specific program has not included any information indicating the corresponding state of the above-described scanner to the specific program, even in the above-described case. Due to this, there has been no way for the information processing apparatus to perform the specific processing for the file indicating the image read by the scanner not corresponding to the specific program. Accordingly, there is still room for improvement for the processing for generating the file of the image read by the scanner.

In view of the above-described situation, in the second embodiment, in a case of generating a PDF file X11 indicating an image read by the MFP 10B which is capable of corresponding to the specific processing application 200 but is not set to correspond to the specific processing application 200, the scanning application 100 embeds identification information T of the MFP 10B in the header of the PDF file X11, and the specific application processing 200 obtains the flag Y of the MFP 10. With this, in a case that the specific processing application 200 accesses the PDF file X11, the specific processing application 200 uses the identification information T embedded in the PDF file X11 so as to connect to the MFP 10B. Further, the specific processing application 200 obtains the flag Y from the MFP 10B, and the specific processing application 200 is capable of performing the specific processing to the PDF file X11, depending on the obtained flag Y. Namely, the SP 60 is capable of performing the specific processing to the PDF file X11 of the image read by the MFP 10B not corresponding to the specific processing application 200, depending on the latest corresponding state of the MFP 10B to the specific processing application 200.

Figure 9:
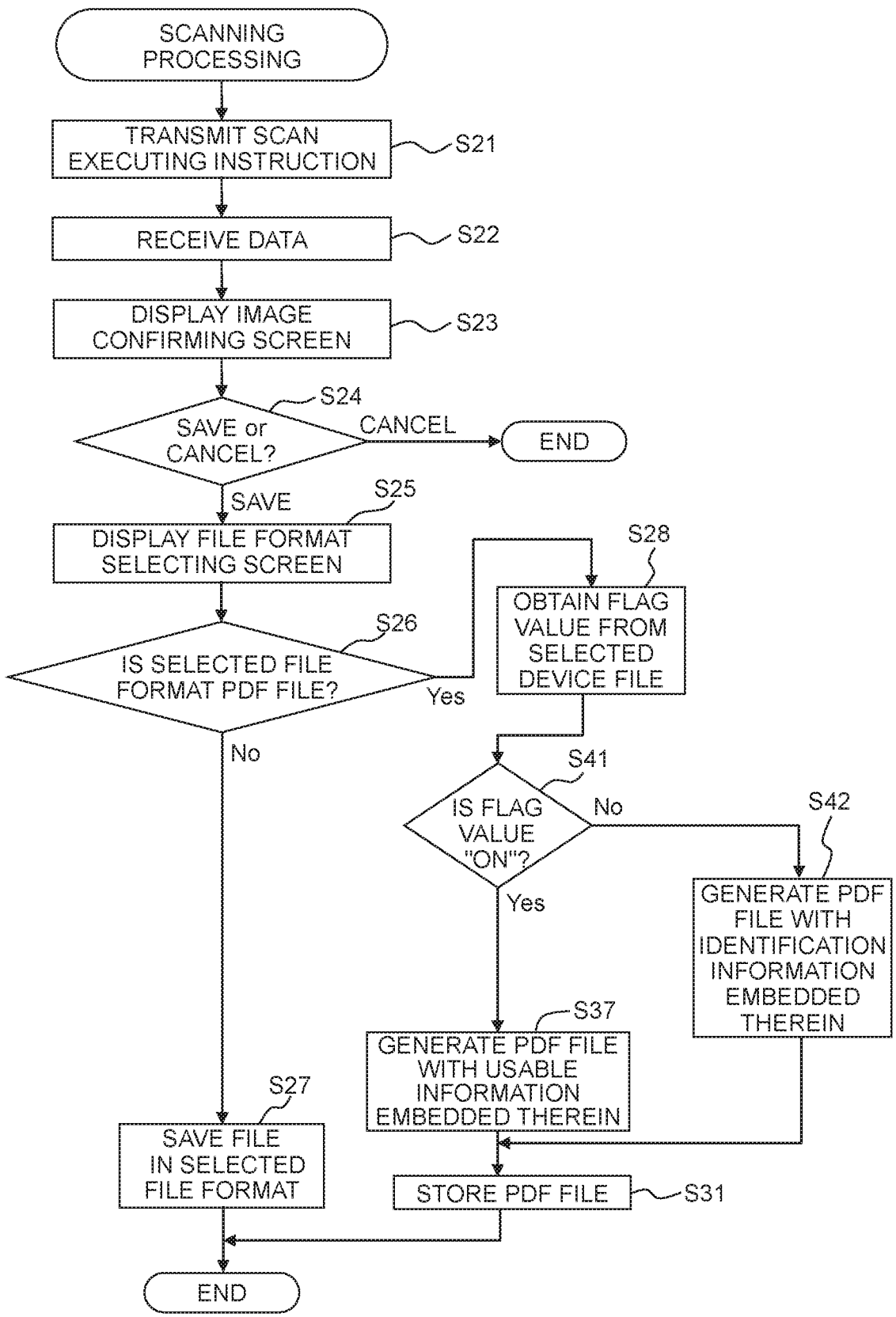
FIG. 9 is a flowchart of a scanning processing.

Next, a scanning processing executed by the scanning application 100 will be explained with reference to FIG. 9. Under a condition that the CPU 71 receives a scan executing instruction, the CPU 71 executes the scanning processing as depicted in FIG. 9.

In the scanning processing, in a case that the PDF is selected as the file format in the file format selecting screen 140 (S26: YES), the CPU 71 obtains the flag value from the selected device file 5 (S28). In a case that the CPU 71 determines that the obtained flag value is not "ON" (S41: NO), the CPU 71 generates a PDF file X in which identification information T is embedded (S42). Namely, in a case that the CPU 71 generates the PDF file X1 of the image read by the MFP 10B not corresponding to the specific processing application 200, the CPU 71 reads the identification information T of the MFP 10B out from the identification information storing area 52 of the selected device file 5, and embeds the identification information T in the header of the PDF file 11X. The CPU 71 stores the PDF file 11X generated in step S42 in the first folder 3 (S31), and ends the processing. Note that in a case that the obtained flag value is "ON" (S41: YES), the CPU 71 performs the processing in step S37 and the processing thereafter. Since the processing in step S37 and the processing thereafter have been described above, the explanation therefor will be omitted.

Figure 10:
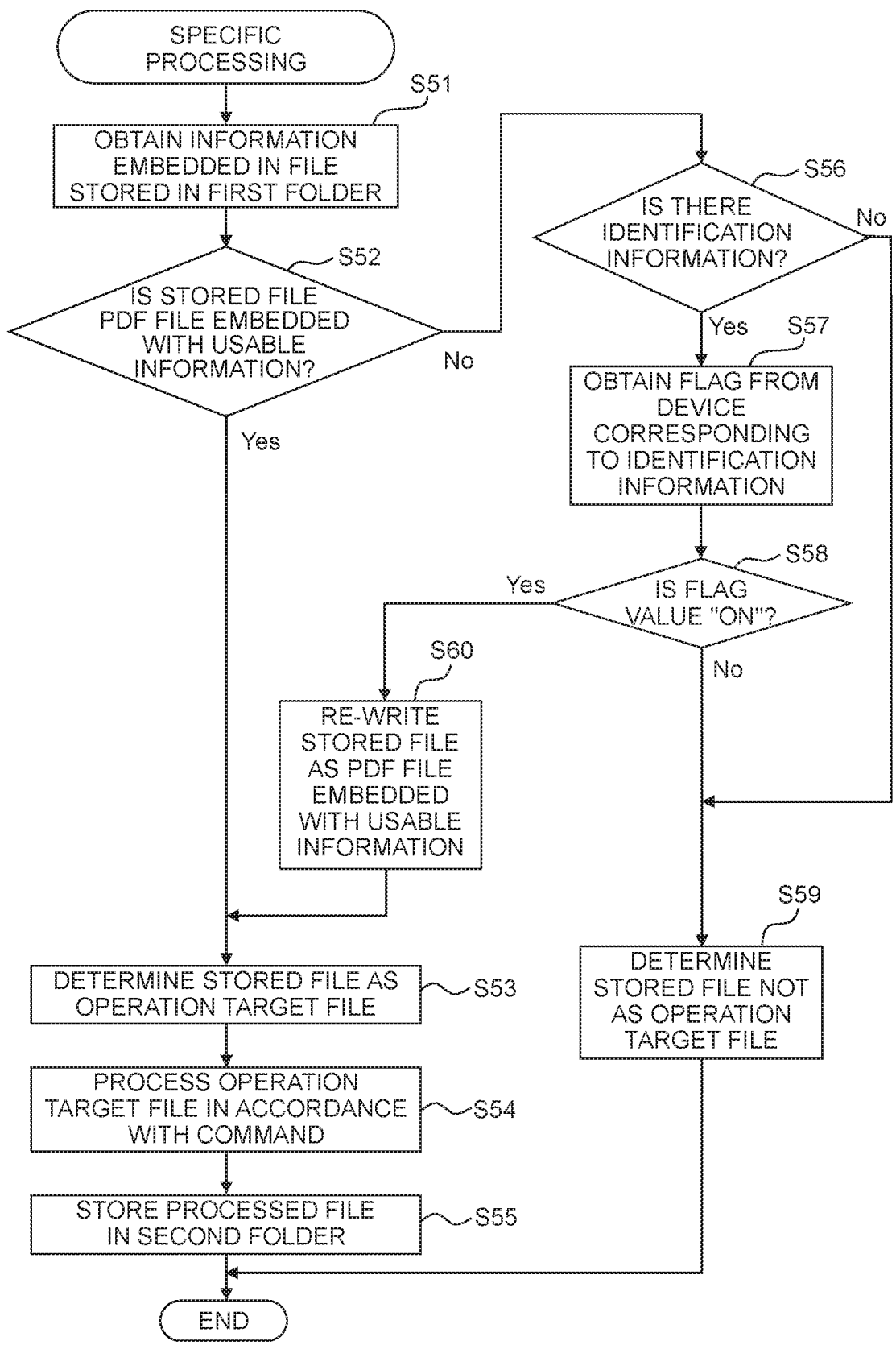
FIG. 10 is a flowchart of a specific processing.

Next, a specific processing executed by the specific processing application 200 will be explained with reference to FIG. 10. Under a condition that a file is stored in the first folder 3, the CPU 71 is triggered by the above-described storage of the file and executes (performs) a specific processing as depicted in FIG. 10.

The CPU 71 obtains embedded information embedded in the header of the file stored in the first folder 3 (S51). Information regarding, for example, a processing for the file, etc., is embedded in the header of the file. Then, the CPU 71 determines whether the file stored in the first folder 3 is a PDF file X in which the usable information Z is embedded, based on the embedded information obtained in step S51 (S52).

In a case that the embedded information obtained in step S51 includes the usable information Z, namely in a case that the CPU 71 determines that the file stored in the first folder 3 is the PDF file X1 in which the usable information Z is embedded (S52: YES), the CPU 71 determines that the file is an operation-object file as an object (target) of the specific processing application 2 (S53). Then, the CPU 71 performs the processing for the operation-object file, in accordance with the command included in the usable information Z (S54), and stores the file after the processing in the second file 4 (S55). Afterwards, the CPU 71 ends the processing.

Namely, in a case that the embedded information includes the usable information Z, the CPU 70 is capable of confirming that the file is the file of the image read by the MFP 10 corresponding to the specific processing application 200, and of performing the specific processing for the file.

In contrast, in a case that the embedded information obtained in step S51 does not include the usable information Z, namely that the file stored in the first folder 3 is the PDF file X11 in which the usable information Z is not embedded (S52: NO), the CPU 71 determines whether the identification information T is embedded in the file (S56).

In a case that the CPU 71 determines that the identification information T is not embedded (S56: NO), the CPU 71 determines that the file is not the operation-target file (S59), and ends the processing. Namely, the specific processing by the specific processing application 200 is not performed, for example, for the file which is stored in the format different from the PDF, and which does not have the usable information Z and the identification information T.

On the other hand, in a case that the CPU 71 determines that the identification information T is embedded (S56: YES), the CPU 71 connects to the MFP 10 corresponding to the identification information T and re-obtains the flag Y (S57). The CPU 71 determines whether the flag value of the flag Y which has been re-obtained is "ON" (S58).

In a case that the flag value of the re-obtained flag Y is not "ON" (S58: NO), the CPU 71 determines that the file is not the operation-object file (S59), and the CPU 71 ends the processing.

For example, there is assumed such a case that the MFP 10B depicted in FIG. 8 has, at the time of purchase, a flag value of "OFF" and that the flag Y has not been rewritten by a service representative (person in charge of service). In such a case, the CPU 71 accesses the PDF file X11, then the CPU 71 connects to the MFP 10B by using the identification information T embedded in the header, and the CPU 71 confirms that the flag value of the flag Y is "OFF". In this case, the CPU 71 does not embed the usable information Z in the PDF file X11 of the image read by the MFP 10B, and does not perform the specific processing by the specific processing application 200.

On the other hand, in a case that the flag value of the re-obtained flag Y is "ON" (S58: YES), the CPU 71 embeds the usable information Z in the header of the PDF file X11, and rewrites the file (S60), as depicted in FIG. 10. Afterwards, the CPU 71 performs the processing in step S53 and the processing thereafter. Since the processing in step S53 and the processing thereafter are described above, the explanation therefor will be omitted.

For example, there is assumed such a case that the MFP 10B depicted in FIG. 8 has, at the time of purchase, the flag value of "OFF" and that the flag value of the flag Y is rewritten to be "ON" by the service representative. In such a case, the CPU 71 accesses the PDF file X11, then the CPU 71 connects to the MFP 10B by using the identification information T embedded in the header, and the CPU 71 confirms that the latest flag value of the flag Y is "ON". In this case, the CPU 71 embeds the usable information Z in the header of the PDF file X11, and rewrites the PDF file X11.

With this, in a case that the CPU 71 accesses the PDF file X11 the next time after the rewriting, it is possible for the CPU 71 to immediately determine that the PDF file 11X is the operation-object file (S51. S52: YES, S53). Accordingly, there is no need for the CPU 71 to connect to the MFP 10B the next time so as to re-obtain the flag Y, thereby reducing the number of times for the communication. As a result, the waiting time for the user can be shortened.

Note that in a case that the scanning application 100 generates a PDF file X12 of an image read by the MFP 10C not corresponding to the specific processing application 200, it is allowable that the scanning application 100 is configured to embed the identification information T of the MFP 10C to the header of the PDF file X12 (S41: NO. S42 of FIG. 9). Then, similarly to those as described above, in the specific processing of the specific processing application 200, the CPU 71 may connect to the MFP 10C by using the identification information T embedded in the PDF file X12, and may perform a processing similar to that performed for the PDF file X11. With this, even provided that the MFP 10C not corresponding to the specific processing application 200 becomes to correspond to the specific processing application 200 by any reason, it is possible to perform, by the specific processing application 200, the specific processing to the PDF file X12 of the image read by the MFP 10C.

As explained above, with respect to the image read by the MFP 10B which is capable of corresponding to the specific processing application 200 but is not set to correspond to the specific processing application 200, namely read by the MFP 10B not corresponding to the specific processing application 200, the scanning application 100 of the second embodiment generates the PDF file X11 in which the identification information T of the MFP 10B is embedded. On the other hand, with respect to the image read by the MFP 10A which corresponds to the specific processing application 200, the scanning application 100 generates a PDF file X11 in which the usable information Z of the MFP 10A is embedded, rather than generating the PDF file X11 in which the identification information T is embedded. Namely, the scanning application 100 switches between the generation of PDF file X11 in which the identification information T is embedded and the generation of PDF file X1 in which the identification information T is not embedded (but the usable information Z is embedded), depending on the kind of the MFP 10.

With respect to the PDF file X11 in which the usable information Z is not embedded, the specific processing application 200 utilizes the identification information T embedded in the PDF file X11 to thereby access the MFP 10B, and the specific processing application 200 uniquely obtains the latest flag Y from the MFP 10B. Further, in a case that the obtained flag Y has a flag value indicating that the flag Y corresponds to the specific processing (namely, "ON"), the specific processing application 200 performs the specific processing for the PDF file X11. On the other hand, in a case that the obtained flag Y has a flag value indicating that the flag Y does not correspond to the specific processing (namely. "OFF"), the specific processing application 200 does not perform the specific processing for the PDF file.

According to the present embodiment, since the scanning application 100 embeds the identification information T in the PDF file X11 of the image read by the MFP 10B not corresponding to the specific processing, the specific processing application 200 is capable of connecting to the MFP 10B not corresponding the specific processing, obtaining the latest flag value therefrom, and performing the specific processing for the PDF file X11 depending on the latest flag value (corresponding state) of the MFP 10B.

Note that the present embodiment is merely an example, and the present disclosure is not limited or restricted by this example. Accordingly, a variety of improvements, changes, modifications, etc., may be made or added to the embodiment in a range not departing from the gist and/or sprit of the present disclosure.

For example, in the above-described embodiment, only the service representative is allowed to rewrite the flag Y. However, it is allowable that the user himself or herself rewrites the flag Y by, for example, inputting an activation code, etc.

For example, in the above-described embodiment, the specific processing application 2 performs the specific processing in accordance with the command embedded in an image, such as the barcode, etc., of the PDF file X. In contrast, it is allowable that the command is previously designated by the specific processing application 2. Namely, it is allowable that the command is not embedded in a file generated by the scanning application 1.

For example, in the above-described embodiment, the flag Y is obtained during the device selection, and the flag value is stored in the selected device file 5 and is used during the file generation. In contrast, it is allowable that the flag Y is obtained from the selected device in a case that a scanner reading instruction (instruction for performing reading in the scanner) is received, and that during the PDF file generation, the PDF file X is generated by using the flag Y obtained when the scanning reading instruction has been received. Namely, it is allowable that the flag Y is obtained every time when a file is generated by performing the scanning. With this, even in a case that the firmware 30 is rewritten and consequently the flag Y is re-written, before the scanner reading instruction is received, the PDF file X can be generated corresponding to the flag Y after the rewriting.

For example, although the flag value of the flag Y is made to be three values which are "ON", "OFF" and "NS" in the above-described embodiment, the flag value may be made to be two value which are "ON" and "OFF". In such a case, in a case that the flag value is "ON", the PDF file X in which the usable information Z is embedded may be generated; whereas in a case that the flag value is "OFF", the PDF file X in which the usable information Z is not embedded may be generated. Further, in the case that the flag value is "OFF", the specific processing application 2 may re-obtain the flag Y so as to obtain the latest flag Y from the selected device. In a case that the latest flag value has been changed from "OFF" to "ON", the specific processing application 2 may generate the PDF file in which the usable information Z is embedded. Namely, there is such a case that although the flag value of the flag Y of the scanner, at the time of purchase, is made to be "OFF" and the scanner does not correspond to the specific processing application 2, the flag value of the flag Y is changed to "ON" later, thereby allowing the scanner to correspond to the specific processing application 2, in some cases. In view of this situation, in a case that the flag value of the flag Y is "OFF" and that the scanner does not correspond to the specific processing application 2, the flag Y is obtained from the scanner every time the PDF file X is generated. With this, the SP 60 is allowed to generate the PDF file depending on the latest corresponding state of the scanner. Note that by making the flag value to be the three values of "ON", "OFF" and "NS", the corresponding state of the scanner can be confirmed in a more detailed manner. With this, it is possible to avoid any unnecessary connection to a scanner which has the flag value of "NS" and of which corresponding state to the specific processing application 2 is unlikely to be changed to "ON".

Figure 7A:
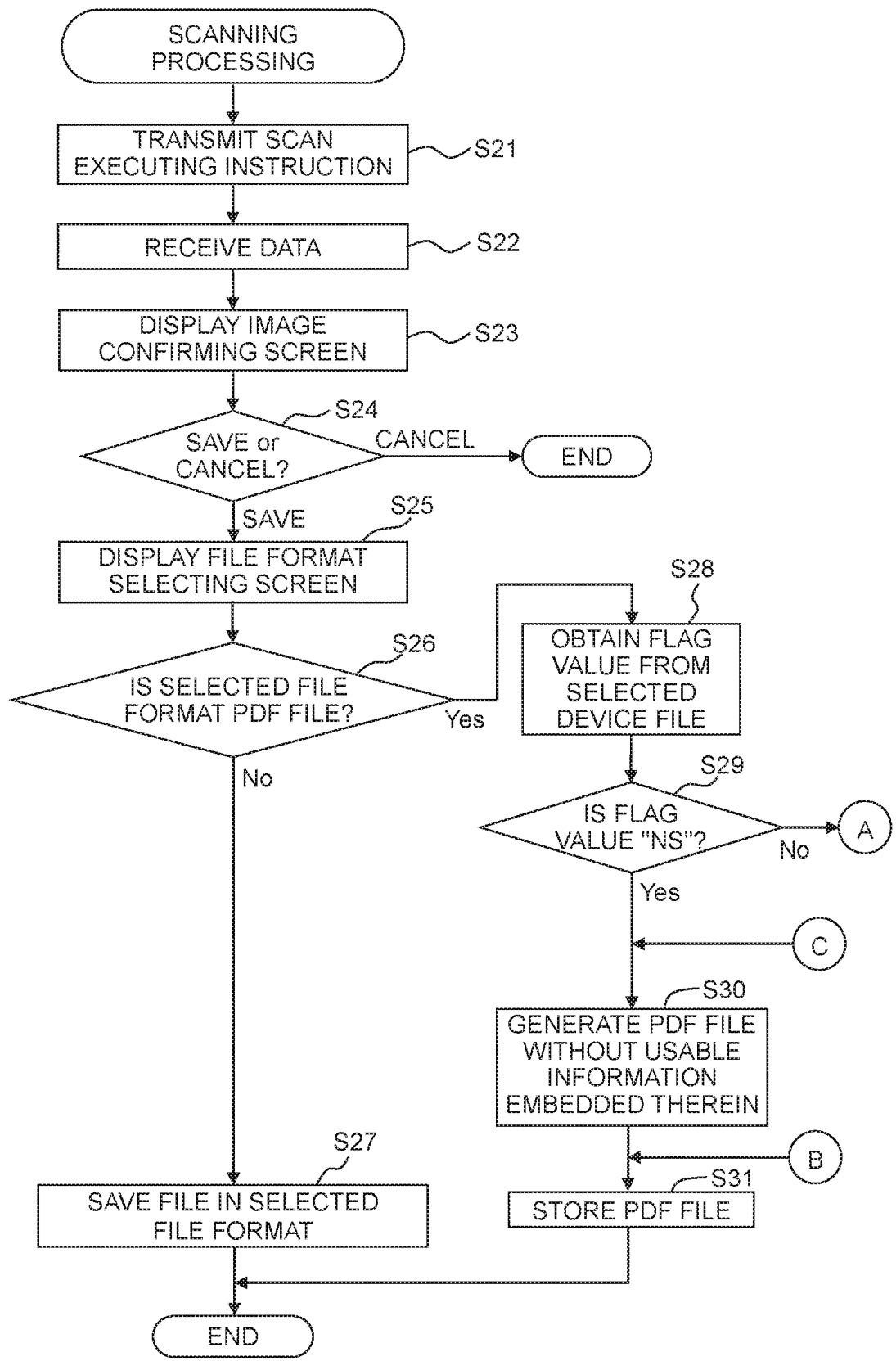

For example, in FIG. 7, in the case that the flag value is "OFF" (S32: NO), the flag Y is re-obtained, and the PDF file is generated depending on the latest flag value. In contrast, also in a case that the flag value is "ON", it is allowable that the flag value is re-obtained and that the PDF file is generated depending on the latest flag value. With this, for example, even in such a case that the flag value of the flag Y is changed from "ON" to "OFF" due to, for example, the passing of the trial period, it is possible to generate the PDF file in which the usable information Z is not embedded, depending on the latest flag value "OFF". Accordingly, it is possible to avoid such a situation that the usable information Z is embedded in the PDF file Z of the image read by the MFP 10 which no longer corresponds to the specific processing application 2, thereby making it possible to limit the application of the specific processing application 2. Note that also in the processing of FIG. 9, in a case that the flag value is "OFF" in step S41 (S41: NO), a processing similar to that describe above may be performed.

For example, it is allowable to perform, after step S29 of FIG. 7, the processing for generating the PDF file in which the identification information T is embedded, as indicated by step S42 of FIG. 9. Namely, in a case that the flag storing area 54 of the selected device file 5 stores the flag value "NS", the identification information T of the MFP 10C may be embedded in the PDF file X. Further, the specific processing application 200 as indicated in FIG. 8 may execute the specific processing as indicated in FIG. 10.

For example, in the above-described embodiment, it is allowable that the ability value(s) of the scanner is obtained while searching the device(s) in step S11 of FIG. 6, and that the processing in step S14 is omitted.

For example, it is allowable that the specific processing application 2, 200 is not activated all the time. Namely, it is allowable that the specific processing application 2, 200 is activated by an instruction from the user, and that the specific processing 2, 200 is performed by the instruction from the user.

For example, in a case that the body of the scanner generates a file (such as a PDF file), the identification information T of the scanner itself may be included in the file (such as the PDF file). In this case, similarly to the above-described second embodiment, the specific processing application 200 executes the processing depicted in FIG. 10 to thereby use the identification information T, to obtain the latest flag value from the scanner body which has generated the PDF file, and to perform the specific processing for the PDF file in accordance with the latest flag value.

Further, it is allowable that the processing(s) disclosed in the present embodiment is executed by a single CPU, a plurality of CPUs, a hardware such as ASIC, or any combination thereof. Furthermore, the processing(s) disclosed in the present embodiment can be realized by a variety of kinds of aspects such as a recording medium storing a program for executing the processing(s), a method for executing the processing(s), etc.

What is claimed is:

1. A non-transitory computer-readable medium storing application program executable by a processor of an information processing apparatus configured to communicate with a scanner having specific information, the specific information indicating whether an image read by the scanner is usable for a specific program different from the application program, the application program, when executed by the processor, causing the information processing apparatus to:
   obtain the image read by the scanner;
   obtain the specific information from the scanner; and
   generate a file indicating the obtained image,
   wherein in a case that the specific information is first information indicating that the image read by the scanner is usable for the specific program, the application program causes the information processing apparatus to generate the file with usable information embedded therein, the usable information indicating that specific processing is executable for the file by the specific program, and
   wherein in a case that the specific information is second information indicating that the image read by the scanner is unusable for the specific program, the application program causes the information processing apparatus to generate the file without the usable information embedded therein.

2. The medium according to claim 1,
   wherein the application program causes the information processing apparatus to:
      obtain the specific information from the scanner, in a case that the information processing apparatus receives a reading execution instruction for performing reading with the scanner; and
      generate the file by using the obtained specific information.

3. The medium according to claim 1,
   wherein the application program causes the information processing apparatus to:

store the specific information in a memory of the information processing apparatus after obtaining the specific information; and generate the file by using the specific information read from the memory.

4. The medium according to claim 3, wherein in a case that the specific information read from the memory is the second information, the application program causes the information processing apparatus to re-obtain the specific information from the scanner; and wherein in a case that the re-obtained specific information is the first information, the application program causes the information processing apparatus to generate the file with the usable information embedded therein.

5. The medium according to claim 3, wherein in a case that the specific information read from the memory is third information, the application program causes the information processing apparatus to re-obtain the specific information from the scanner, the third information indicating that the image read by the scanner is unusable for the specific program, the third information being changeable into the first information, and wherein in a case that the re-obtained specific information is the first information, the application program causes the information processing apparatus to generate the file with the usable information embedded therein.

6. The medium according to claim 1, wherein the application program causes the information processing apparatus to generate a PDF file as the file.

7. The medium according to claim 1, wherein the application program causes the information processing apparatus to generate the file with the usable information embedded in a header of the file.

8. The medium according to claim 1, wherein in a case that the application program causes the information processing apparatus to generate the file without the usable information embedded therein, the application program causes the information processing apparatus to generate the file with identification information identifying the scanner embedded therein, wherein in a case that the file having the identification information embedded therein is read by the specific program, the specific program uses the identification information to obtain the specific information from the scanner, and wherein in a case that the obtained specific information is the first information, the specific program executes the specific processing for the file read by the specific program.

9. The medium according to claim 1, wherein in a case that the application program causes the information processing apparatus to generate the file with the usable information embedded therein, the application program causes the information processing apparatus to generate the file with identification information identifying the scanner embedded therein, wherein in a case that the file having the identification information embedded therein is read by the specific program, the specific program uses the identification information to obtain the specific information from the scanner, and wherein in a case that the obtained specific information is the second information, the specific program does not execute the specific processing for the file read by the specific program.

10. The medium according to claim 1, wherein the application program causes the information processing apparatus to further determine whether the specific information is the first information or the second information, after the specific information is obtained from the scanner.

11. A scan system comprising:

a scanner configured to read an image and having specific information, the specific information indicating whether the image read by the scanner is usable for a specific program; and an information processing apparatus configured to communicate with the scanner, wherein the information processing apparatus is configured to:

obtain the image read by the scanner;

obtain the specific information from the scanner; and generate a file indicating the obtained image, wherein in a case that the specific information is first information indicating that the image read by the scanner is usable for the specific program, the information processing apparatus is configured to generate the file with usable information embedded therein, the usable information indicating that specific processing is executable for the file by the specific program, and wherein in a case that the specific information is second information indicating that the image read by the scanner is unusable for the specific program, the information processing apparatus is configured to generate the file without the usable information embedded therein.

12. A method for generating a file indicating an image, comprising:

reading the image by a scanner having specific information, the specific information indicating whether the image read by the scanner is usable for a specific program;

obtaining the image read by the scanner;

obtaining the specific information from the scanner; and generating the file indicating the obtained image, wherein in a case that the specific information is first information indicating that the image read by the scanner is usable for the specific program, usable information is embedded in the file, the usable information indicating that specific processing is executable for the file by the specific program, and wherein in a case that the specific information is second information indicating that the image read by the scanner is unusable for the specific program, the usable information is not embedded in the file.

* * * * *